United States Patent
Descharles et al.

(10) Patent No.: US 8,441,392 B2
(45) Date of Patent: May 14, 2013

(54) METHOD AND SYSTEM FOR LOCATING A TARGET IN AN INTERROGATION-RESPONSE SYSTEM (IFF)

(75) Inventors: Cyril Descharles, Pantin (FR); Thierry Triconnet, Paris (FR)

(73) Assignee: Thales, Neuilly sur Seine (FR)

( * ) Notice: Subject to any disclaimer, the term of this patent is extended or adjusted under 35 U.S.C. 154(b) by 147 days.

(21) Appl. No.: 13/142,724

(22) PCT Filed: Dec. 11, 2009

(86) PCT No.: PCT/EP2009/066987
§ 371 (c)(1),
(2), (4) Date: Aug. 24, 2011

(87) PCT Pub. No.: WO2010/076161
PCT Pub. Date: Jul. 8, 2010

(65) Prior Publication Data
US 2011/0309966 A1    Dec. 22, 2011

(30) Foreign Application Priority Data
Dec. 30, 2008  (FR) ...................................... 08 07492

(51) Int. Cl.
*G01S 13/78*  (2006.01)
*G01S 13/44*  (2006.01)

(52) U.S. Cl.
USPC .............. 342/45; 342/140; 342/149; 342/152

(58) Field of Classification Search .................... 342/42, 342/45, 80, 125, 133, 139–140, 146–147, 342/149–154, 194
See application file for complete search history.

(56) References Cited

U.S. PATENT DOCUMENTS

| | | | |
|---|---|---|---|
| 5,892,478 A * | 4/1999 | Moss ............................. | 342/149 |
| 5,905,463 A * | 5/1999 | Hannan ......................... | 342/373 |
| 6,456,238 B1 | 9/2002 | Posey | |
| 6,630,902 B1 * | 10/2003 | Fenton et al. ................. | 342/100 |
| 6,933,879 B2 * | 8/2005 | Roze et al. ..................... | 342/45 |
| 7,675,456 B2 * | 3/2010 | Karam et al. .................. | 342/45 |
| 8,325,081 B2 * | 12/2012 | Rivers et al. ................... | 342/45 |
| 2010/0026553 A1 * | 2/2010 | Billaud ........................... | 342/37 |
| 2011/0102236 A1 * | 5/2011 | Wajer ............................. | 342/45 |
| 2011/0309966 A1 * | 12/2011 | Descharles et al. ............ | 342/45 |
| 2012/0068878 A1 * | 3/2012 | Billaud ........................... | 342/37 |

FOREIGN PATENT DOCUMENTS

| | | |
|---|---|---|
| DE | 2737750 C1 | 10/1985 |
| FR | 2838196 A1 | 10/2003 |
| GB | 2281671 A | 3/1995 |

OTHER PUBLICATIONS

Janex A Ed—Institution of Electrical Engineers: "3D Monopulse Localization in Airborne IFF Interrogator," Radar International Conference. London, Oct. 19-21, 1987; London, IEEE, GB, vol. -, Oct. 19, 1987, pp. 185-188.

* cited by examiner

*Primary Examiner* — John B Sotomayor
(74) *Attorney, Agent, or Firm* — Baker Hostetler LLP

(57) ABSTRACT

A method and system for locating a target, of azimuth $A_{estimated}^{target}$ and of elevation angle $S_{estimated}^{target}$, in space by a carrier uses at least one first antenna array with electronic scanning ARRAY_H and at least one second antenna array with electronic scanning ARRAY_B. The target emits a signal in response to an interrogation from the carrier, each of said antenna arrays includes at least one antenna and the total number of antennas used is at least equal to three.

7 Claims, 3 Drawing Sheets

Fig. 3a ChannelTx

Fig 3b: ChannelTx ∩ Rx

Fig 3c: ChannelTx ∩ Rx ∩ R'x

Fig 3d: Channel Tx ∩ Rx ∩ R'x ∩ amplitude

METHOD AND SYSTEM FOR LOCATING A TARGET IN AN INTERROGATION-RESPONSE SYSTEM (IFF)

CROSS-REFERENCE TO RELATED APPLICATIONS

This application is a National Stage of International patent application PCT/EP2009/066987, filed on Dec. 11, 2009, which claims priority to foreign French patent application No. FR 08 07492, filed on Dec. 30, 2008, the disclosures of which are incorporated by reference in their entirety.

FIELD OF THE INVENTION

The present invention relates to a method and a system for locating, by a carrier, a target in space. It applies, for example, in the aeronautical domain, for an embedded interrogation-response system of IFF (identification friend or foe) type, also called secondary radar. It also relates to IFF systems with electronic pointing using two non-colocated antenna arrays. Furthermore, the present invention also relates to the amplitude and phase angle error measurement domain, that is to say all the methods used to determine the error between a targeted point and the point actually reached.

BACKGROUND OF THE INVENTION

The location and identification of a distant aircraft require two distinct radars. A first radar, or primary radar, is used to locate the target and a secondary radar, or IFF, is used to identify it. Correlation of these two information items (location and identification) is immediate when the primary antenna and the secondary antenna are coupled. Such an operation is commonly used for ground stations and when the radars have mechanical scanning.

The technological trend in the antenna domain has made it possible, notably, to develop antennas with electronic scanning. The antenna is, in this case, fixed, and the direction of pointing of the beam is obtained by means of electronic phase-shifters whose function is to deflect the beams. The primary radar and the secondary radar may be independent of one another and the correlation of the two information sources becomes more difficult. SUMMARY OF THE INVENTION The transmission by the IFF system of the location and identification information items to the main computer of the carrier makes it possible to associate them with the location information items obtained by the primary radar.

The object of the invention relates to a method and a system for locating a target in space, during, for example, an IFF interrogation process and by using one or more antenna arrays with electronic scanning.

Locating a target in space entails using one or more antenna arrays with electronic scanning consisting of one or more individual antennas. Each of these linear antenna arrays produces one or more vertical lobes that make it possible to locate a target in the plane transversal to the direction of pointing of the antennas in a direction associated with the axis of the antenna array. The expression "linear antenna array" should be understood to mean an array for which the individual antennas are positioned in a horizontal direction which defines the axis of the antenna array. The azimuth location is obtained by a monopulse technique, a technique known to those skilled in the art. However, this method generates an uncertainty on the positioning of the target as illustrated by FIG. 1. The iso-monopulse angle measurement curves obtained are not vertical in the plane (azimuth-elevation angle), and the accurate determination of the azimuth of the target from the monopulse information item then requires a knowledge of the elevation angle of the target.

As an example, FIG. 1 illustrates the azimuth error that may result from the use of a linear array and electronic pointing in the case where the elevation angle information item is not known. For a zero azimuth steering angle, that is to say, an interrogation of the secondary radar in the axis, or a small steering angle (pointing angle equal to 10°), the iso-monopulse measurement curves are substantially vertical in the plane (azimuth-elevation angle), or in any case for a limited range of variation of the elevation angle (for example, plus or minus 40°). For a greater steering angle (pointing=30° and pointing=50° curves), the iso-monopulse measurement curve is distorted. Consequently, as an example, for a pointing of 30°, the target of elevation angle 38.9° and of azimuth 40° has the same monopulse measurement value as the target of elevation angle 0° and of azimuth 30°. If the elevation angle is not known, the result is an azimuth error of 10° for the target of elevation angle 40°. Knowing the elevation angle therefore makes it possible to determine the azimuth more accurately.

The patent FR2838196 filed by the applicant describes a method and a system for locating a target in an IFF system that makes it possible to determine the elevation angle of said target, notably by using mode C of the IFF standard. The method described has the drawback of being linked to certain modes of use of the IFF standard. It presupposes the interpretation of transmitted information via a response from the target to the carrier following an IFF interrogation from said carrier. These information items are used to calculate the elevation angle of the target.

The invention proposes overcoming this limitation by introducing a method that makes it possible to determine the elevation angle of the target, independently of the IFF interrogation mode used and without decoding any information transmitted in the response from the target to the carrier. The proposed solution is based only on the processing of the signals received without analyzing the information conveyed by said signals.

To this end, the subject of the invention is a method for locating, by a carrier, a target of azimuth $A_{estimated}^{target}$ and of elevation angle $S_{estimated}^{target}$ in space using at least one first linear antenna array with electronic scanning ARRAY_H comprising at least one individual antenna and at least one second linear antenna array with electronic scanning ARRAY_B comprising at least two individual antennas, said target emitting a signal in response to an interrogation from the carrier, characterized in that it comprises at least the following steps:

step 1: creating a third combined linear antenna array ARRAY_C by coupling at least one individual antenna of the antenna array ARRAY_H and at least one individual antenna of the antenna array ARRAY_B, step 2: determining the monopulse angle $\Psi_{Rx}^{H}(A,S)$ or $\Psi_{Rx}^{B}(A,S)$, so as to define a first response acceptance zone $ZAR_1$, by a measurement on the signal emitted by the target and received on one of the antenna arrays ARRAY_H or ARRAY_B, with A and S being the potential azimuth and elevation angle values of said target, step 3: determining the monopulse angle $\Psi_{Rx}^{C}(A,S)$, so as to define a second response acceptance zone $ZAR_2$, by a measurement on the signal emitted by the target and received on the combined antenna array ARRAY_C, said zone being formed by one or more windows in the plane (A,S), step 4: forming, from at least the information items $\Psi_{Rx}^H(A,S)$ and $\Psi_{Rx}^C(A,S)$ or $\Psi_{Rx}^B(A,S)$ and $\Psi_{Rx}^C(A,S)$, a third response acceptance zone $ZAR_3$ equal to the intersection of the two zones $ZAR_1$ and $ZAR_2$ defined previously and making it possible to locate the target from its coordinates $(A_{estimated}^{target}, S_{estimated}^{target})$ In a variant embodiment, the method according to the invention also comprises the following step:

step 5: Forming a fourth response acceptance zone $ZAR_4$ by eliminating the secondary windows from the zone $ZAR_2$ by comparison of the signal level received on the antenna array ARRAY_H with that received on the antenna array ARRAY_B via an amplitude discrimination method.

In a variant embodiment, the method according to the invention also comprises the following step:

step 6: accurately determining a measurement of the elevation angle $S_{estimated}^{target}$ of the target based on the monopulse angles $(\Psi_{Rx}^k(A,S), \Psi_{Rx}^C(A,S))$, in which k is to be replaced by B or H, using the following equation:

$$S_{estimated}^{target} = \frac{[a_{(A_{ir},S_{ir})}^C \cdot b_{(A_{ir},S_{ir})}^k (\Psi_{Rx}^k(A,S)) + b_{(A_{ir},S_{ir})}^C (\Psi_{Rx}^C(A,S))]}{[1 - a_{(A_{ir},S_{ir})}^C \cdot a_{(A_{ir},S_{ir})}^k]}$$

in which $a_{(A_{ir},S_{ir})}^k$ and $a_{(A_{ir},S_{ir})}^C$ are parameters dependent on the direction of pointing of the antennas which are calculated on the basis of the patterns of said individual antennas respectively used to form the antenna array ARRAY_H (or ARRAY_B) and the antenna array ARRAY_C, in which $b_{(A_{ir},S_{ir})}^k(\Psi_{Rx}^k(A,S))$ are obtained by a polynomial modeling of the trend of the monopulse angle as a function of the azimuth for a fixed elevation angle value, or as a function of the elevation angle for a fixed azimuth value, with k=H, B or C.

In a variant embodiment, the method according to the invention also comprises the following step:

step 7: accurately determining a measurement of the azimuth $A_{estimated}^{target}$ of the target based on the monopulse angles $(\Psi_{Rx}^k(A,S), \Psi_{Rx}^C(A,S))$ and on a measurement of the elevation angle $S_{estimated}^{target}$ of the target, in which k is to be replaced by B or H, using the following equation:

$$A_{estimated}^{target} = a_{(A_{ir},S_{ir})}^k S_{estimated}^{target} + b_{(A_{ir},S_{ir})}^k (\Psi_{Rx}^k(A,S))$$

in which $a_{(A_{ir},S_{ir})}^k$ are parameters dependent on the direction of pointing of the antennas and calculated on the basis of the patterns of said individual antennas used to form the antenna arrays ARRAY_H or ARRAY_B, in which $b_{(A_{ir},S_{ir})}^k(\Psi_{Rx}^k(A,S))$ are parameters obtained by a polynomial modeling of the trend of the monopulse angle as a function of the azimuth for a fixed elevation angle value, or as a function of the elevation angle for a fixed azimuth value, with k=B or H.

In a variant embodiment, the antenna arrays ARRAY_H and ARRAY_B are located on the nose cone of said carrier and the antenna array ARRAY_H is located vertically to the antenna array ARRAY_B.

In a variant embodiment, the interrogation mode from the carrier to the target is an IFF mode.

Also the subject of the invention is a system for locating a target by a carrier equipped with a primary radar and a secondary radar, characterized in that it comprises an interrogation-response system which comprises at least a first antenna array, a second antenna array, a switching matrix, a beam combiner, a receiver and a computer suitable for implementing the characteristics of the elevation angle and azimuth location method described previously.

BRIEF DESCRIPTION OF THE DRAWINGS

Other features and advantages of the present invention will become more apparent from reading the following description in relation to the appended drawings which represent.

DETAILED DESCRIPTION.

Figure 1:
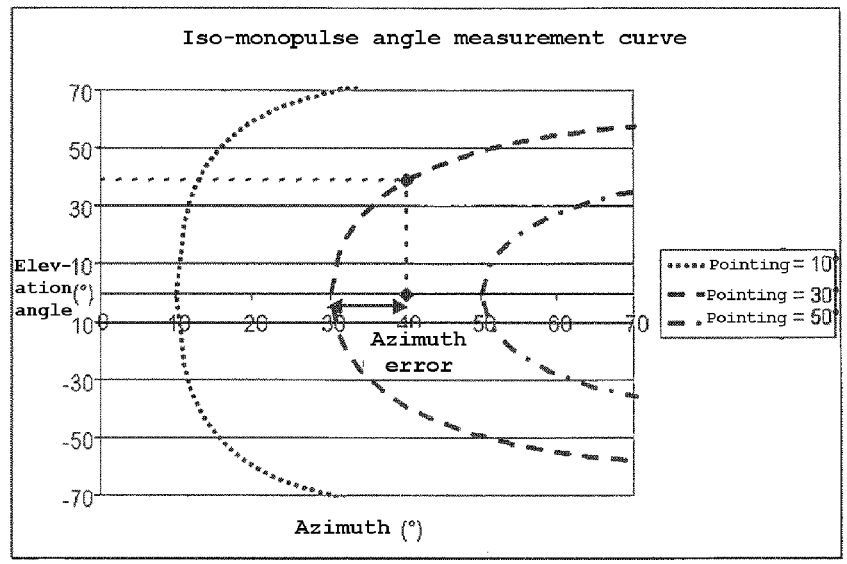
FIG. 1, an illustration of the azimuth error in the case where the elevation angle information is not known, FIG. 2, an illustration of the positioning of the antenna arrays on the nose cone of an airplane, FIG. 3, a diagram of the principle of location by overlapping of the areas interrogated (channels Tx, Rx, R'x and amplitude discrimination), FIG. 4, a general block diagram of an interrogation-response system that can be used to implement the method according to the invention, FIG. 5, an illustration of several examples of minimal antenna configuration.
Figure 2:
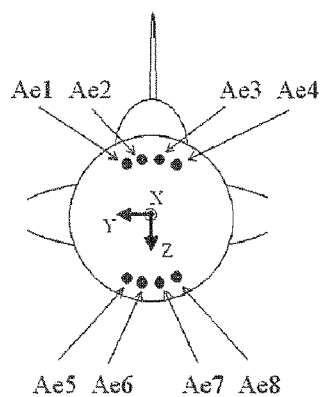

In order to better convey an understanding of the object of the present invention, the following nonlimiting description given as an illustration deals with a system comprising a target to be located and a carrier (airplane for example) equipped with two antenna arrays with electronic scanning each comprising at least one antenna. The two arrays are located, preferably, but in a nonlimiting manner, on the nose cone of the carrier. An example of positioning of the antenna arrays in the case where they each comprise four antennas is illustrated in FIG. 2. Hereinafter in the text, the description will be based on this example, it being understood that other antenna positioning configurations can be envisaged.

The nose cone of the carrier comprises a top antenna array called ARRAY_H comprising four individual antennas, Ae1, Ae2, Ae3 and Ae4 and a bottom antenna array called ARRAY_B also comprising four individual antennas, Ae5, Ae6, Ae7 and Ae8. A third antenna array or combined array, ARRAY_C, is created by grouping together two individual antennas of each of the arrays ARRAY_H and ARRAY_B, preferably the two individual antennas closest to one another in each of the two arrays, namely Ae2, Ae3, Ae6 and Ae7 in the example illustrated. Thus, the arrays ARRAY_H and ARRAY_B have similar pointing directions whereas ARRAY_C has a pointing direction that is different from the other two.

The antennas with electronic scanning are known to those skilled in the art, and they are not the subject of the invention, so their architecture will not be detailed.

The method according to the invention is based on the combined use of the three antenna arrays introduced previously (ARRAY_H, ARRAY_B and ARRAY_C). On receiving a response emitted by the target to be located, for example a response to an IFF interrogation, the signals received on the four individual antennas of an array, respectively denoted $V_{Ae1}, V_{Ae2}, V_{Ae3}$ and $V_{Ae4}$ are combined to form a sum signal $S_{Ae}=(V_{Ae1}+V_{Ae2}+V_{Ae3}+V_{Ae4})$ and a difference signal $D_{Ae}=(V_{Ae1}+V_{Ae2}-(V_{Ae3}+V_{Ae4}))$. This combination is produced, for example, by phase-shifting, by a specific value, each of the channels in order to orient the beam in the desired pointing direction. It can also be done by modifying, in addition, the amplitude component of the waves received on each of the channels. The sum $S_{Ae}$ and difference $D_{Ae}$ signals are then recombined, according to a method known to those skilled in the art and using, for example, a half-angle error measurement processor, in order to create a monopulse angle information item Ψ. This angle is used to locate the response originating from the target relative to the direction of pointing of the beam.

Figure 3:
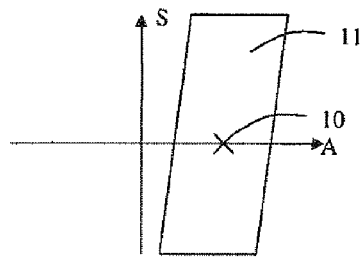
Figure 3:
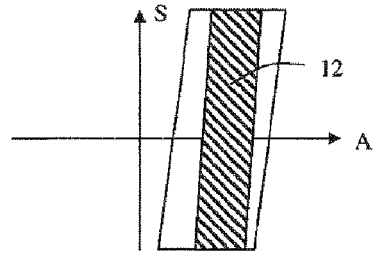
Figure 3:
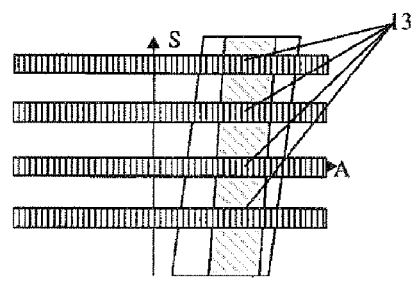
Figure 3:
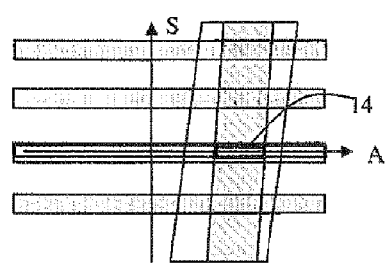

FIG. 3 presents the principle of location of a target by overlapping of the areas interrogated. The patterns schematically represented represent the transverse plane of the carrier, the horizontal axis corresponds to the azimuth of the target and the vertical axis to its elevation angle, the various acceptance regions (ZAR) represented in FIGS. 3a to 3d are obtained, at least from a monopulse angle information item. A ZAR is a zone of the plane (azimuth, target) in which there is an attempt to locate one or more targets. The response acceptance zones are defined in light of the RSLS criteria associated with each antenna coupling. RSLS is an acronym known to those skilled in the art corresponding to Reception Side Lobe Suppression. The RSLS processing consists in comparing the amplitude of the signals of the sum $S_{Ae}$ and difference $D_{Ae}$ channels. A signal of the sum channel is taken into account only if the value of its amplitude is at least equal to the sum of the value of the amplitude of the signal on the difference channel and of a predetermined value. One of the aims of the invention is to determine the position of the target, 10, or at least a windowing making it possible to locate it with minimum uncertainty. FIG. 3a represents the zone, 11, (in the plane (azimuth, elevation angle)) interrogated by the carrier, via, for example, an IFF-type interrogation. This zone defines the window in which the carrier is seeking to locate a target. Said target responds to the carrier, by using, for example, a response in accordance with the IFF standard (in response to the preceding interrogation). FIG. 3b then illustrates the acceptance zone $ZAR_1$, 12, (channel Rx) of the response for a pattern formed by the antenna array ARRAY_H or ARRAY_B. The new antenna array ARRAY_C makes it possible, according to the invention and as described in FIG. 3c, to form a channel R'x corresponding to the acceptance zone $ZAR_2$, 13, of the responses of the new pattern formed by combining two individual antennas of each of the arrays ARRAY_H and ARRAY_B. In the example described here, the acceptance zone $ZAR_2$ defines a number of windows, 13, in the plane (azimuth, elevation angle) which correspond to secondary lobes. These ambiguities are due, in the example illustrated in FIG. 2, to the pitch of the antenna array ARRAY_C which is also equal to the distance between the arrays ARRAY_H and ARRAY_B which is not adapted with respect to the wavelength of the received signal, this distance more often than not being imposed by the geometry of the carrier. In order to eliminate these ambiguities, the proposed solution consists in comparing the levels of the signals received respectively on the antenna array ARRAY_H and the antenna array ARRAY_B which makes it possible to restrict the band of potential values for the elevation angle of the target and therefore eliminate the secondary lobes in order to more accurately define the target location window as illustrated in FIG. 3c. This last step is carried out by an amplitude discrimination method known to those skilled in the art. The intersection of the various areas determined in the preceding steps leads to a response acceptance zone $ZAR_3$, 14, that makes it possible to locate the target, 10.

In order to implement the method according to the invention as described previously, it is necessary to acquire simultaneously, alternately or sequentially the monopulse angle and amplitude information items corresponding to the three antenna arrays ARRAY_H, ARRAY_B and ARRAY_C. This acquisition can be done during a burst of unitary interrogations corresponding, for example, to an IFF-type interrogation. From a time point of view, the combinations of individual antennas can be produced either sequentially or alternately. Sequential management consists in breaking down the demand into three sub-bursts of interrogations each relating to the three arrays concerned. Alternate management consists in alternating the reception antenna mode on each unitary interrogation.

The steps described previously make it possible, in a first phase, to locate the target in an acceptance window of reduced size. In a second phase, the elevation angle and azimuth coordinates of the target can be refined based on the knowledge, on the one hand, of the antenna patterns of the antennas used (or of parameters tabulated on the basis of the latter), and, on the other hand, of the value of the half-angle angle error measurement angles relative to different antenna lobes. To this end, hereinafter in the text, the coordinates of the target to be located will be denoted respectively $S_{estimated}^{target}$ for the elevation angle coordinate and $A_{estimated}^{target}$ for the azimuth coordinate.

The method for determining the pair ($A_{estimated}^{target}$, $S_{estimated}^{target}$) according to the invention is based on the half-angle angle error measurement principle used to calculate the angular position in azimuth of a target having responded to an interrogation, for example of IFF type, when the altitude of the target is known (case of the state of the art). This principle is here refined and extended to the calculation of the elevation angle and of the azimuth when the altitude of the target is this time unknown.

The coupling of the individual antennas of the arrays ARRAY_H and ARRAY_B, respectively, makes it possible, after recombination of the waves received by each of the individual antennas which will have been phase-shifted and combined, to create a sum signal $S_{Ae}$ which corresponds to a maximum gain in the direction of pointing of the antennas and a difference signal $D_{Ae}$ which corresponds to a minimum gain in the pointing direction. From the signals $S_{Ae}$ and $D_{Ae}$, it is possible to determine the monopulse angle relative to each of the arrays ARRAY_H and ARRAY_B: $\Psi_{Rx}^{H}(A,S)$ and $\Psi^{B}(A,S)$. Similarly, the recombination of the waves received on each of the individual antennas on the array ARRAY_C also makes it possible to create a sum signal and a difference signal from which is derived the associated monopulse angle $\Psi_{Rx}^{C}(A,S)$. For response acceptance zones (ZAR) which extend around the pointing direction up to some fifteen degrees in azimuth and up to five or so degrees in elevation angle, a bijective relationship can be determined between $\Psi_{Rx}^{H}(A,S)$ (or $\Psi_{Rx}^{B}(A,S)$) and A and similarly between $\Psi_{Rx}^{C}(A,S)$ and S. The dependence of the value of the monopulse angle as a function of the elevation angle can then be defined as an additive component to the azimuthal dependence.

This means that the following can be written:

$$S_{estimated}^{target} = a_{(A_{ir},S_{ir})}^{C} A_{estimated}^{target} + b_{(A_{ir},S_{ir})}^{C}(\Psi_{Rx}^{C}(A,S))$$

$$A_{estimated}^{target} = a_{(A_{ir},S_{ir})}^{C} S_{estimated}^{target} + b_{(A_{ir},S_{ir})}^{C}(\Psi_{Rx}^{C}(A,S)) \qquad (1)$$

Thus, the position of the target relative to the pointing direction is given by:

$$S_{estimated}^{target} = \frac{[a_{(A_{ir},S_{ir})}^{C} \cdot b_{(A_{ir},S_{ir})}^{k}(\Psi_{Rx}^{k}(A,S)) + b_{(A_{ir},S_{ir})}^{C}(\Psi_{Rx}^{C}(A,S))]}{[1 - a_{(A_{ir},S_{ir})}^{C} \cdot a_{(A_{ir},S_{ir})}^{k}]} \qquad (2)$$

-continued $$A_{estimated}^{target} = a_{(A_{ir},S_{ir})}^{k} S_{estimée}^{cible} + b_{(A_{ir},S_{ir})}^{k}(\Psi_{Rx}^{k}(A,S))$$

With:
- k: index of the top or bottom array (k=H or B) depending on the pointing elevation,
- $S_{ir}$: elevation angle of the pointing direction,
- $A_{ir}$: azimuth of the pointing direction,
- $S_{estimated}^{target}$: calculated elevation angle of the target relative to the pointing elevation angle $S_{ir}$,
- $A_{estimated}^{target}$: calculated azimuth of the target relative to the pointing azimuth $A_{ir}$,
- $a_{(A_{ir},S_{ir})}^{k}$ and $a_{(A_{ir},S_{ir})}^{C}$ are parameters which depend on the pointing direction. These parameters are calculated on the basis of the patterns of the individual antennas respectively used to form the antenna array ARRAY_H (or ARRAY_B) and the antenna array ARRAY_C,
- $b_{(A_{ir},S_{ir})}^{k}(\Psi_{Rx}^{k}(A,S))$, with k=H, B or C represent functions which model the trend of the monopulse angle as a function of the azimuth with fixed elevation angle (for ARRAY_H or ARRAY_B) or as a function of the elevation angle with fixed azimuth (ARRAY_C); they are defined by:

$$b_{(A_{ir},S_{ir})}^{k}(\Psi_{Rx}^{k}(A,S)) = \sum_{i=0}^{N} \beta_{i,(A_{ir},S_{ir})}^{k}[\Psi_{Rx}^{k}(A,S)]^{i}$$

where N is the order of the polynomial $$f(\Psi_{Rx}^{k}(A,S)) = \sum_{i=0}^{N} \beta_{i,(A_{ir},S_{ir})}^{k}[\Psi_{Rx}^{k}(A,S)]^{i}$$

The location error due to the modeling error introduced by this method is low in the useful angular domain, provided that a 4th order polynomial is used to model the trend of the monopulse angle as a function of the azimuth with fixed elevation angle value. Thus, the coordinates ($A_{estimated}^{target}$, $S_{estimated}^{target}$) of the target can be determined accurately via the preceding steps by using a tabulation, notably for the parameters $\beta_{i,(A_{ir},S_{ir})}^{k}$.

Furthermore, the expression of $A_{estimated}^{target}$ uses the quantity $S_{estimated}^{target}$ explicitly via the formula (2) which makes it possible when, for example, the angle error measurement parameters relative to the determination of $S_{estimated}^{target}$ are not accessible, to introduce a value of $S_{estimated}^{target}$ originating from a different measurement.

Figure 4:
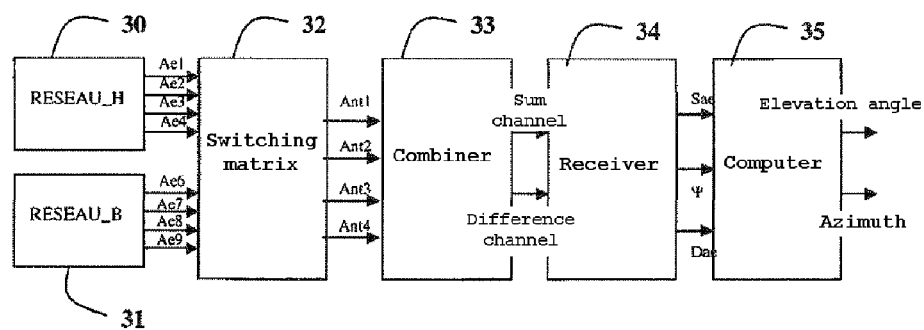

FIG. 4 shows a general block diagram of an interrogation-response system suitable for implementing the method according to the invention. This system may be, for example, an IFF-type system. Said system comprises:
- a top antenna array with electronic scanning ARRAY_H, 30, comprising, for example, four individual antennas Ae1, Ae2, Ae3 and Ae4,
- a bottom antenna array with electronic scanning ARRAY_B, 31, comprising, for example, four individual antennas, Ae5, Ae6, Ae7 and Ae8,
- a combined antenna array ARRAY_C, consisting of the individual antennas Ae2, Ae3, Ae6, Ae7
- a switching matrix, 32, suitable for selecting the individual antennas, Ant1, Ant2, Ant3 and Ant4 from those available in the arrays ARRAY_H, ARRAY_B and ARRAY_C,
- a beam combiner, 33, for forming the Sum Σ and Difference Δ channels from four channels deriving from the individual antennas,
- a receiver, 34, generating the following information:
  - the amplitude $S_{Ae}$ of the Sum channel Σ,
  - the amplitude $D_{Ae}$ of the Difference channel Δ,
  - the angular monopulse measurement ψ,
- a computer, 35, suitable for implementing the steps for locating the elevation angle and azimuth coordinates of the target, according to the invention.

Figure 5:
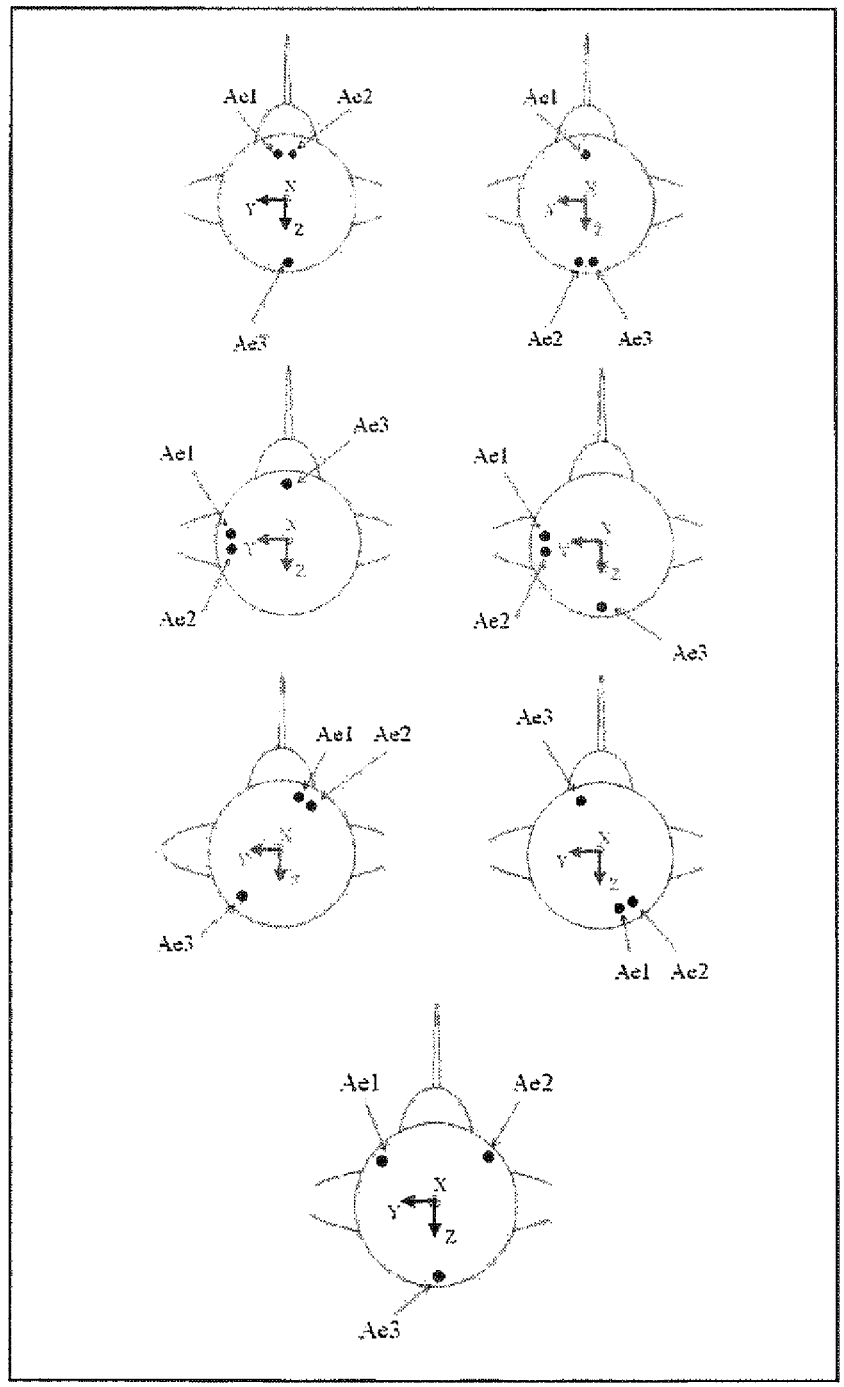

The invention is not limited to the configuration case using two antenna arrays, top and bottom, positioned in the vertical axis of the nose of the carrier and each comprising four individual antennas. FIG. 5 illustrates a number of other examples, which are not limiting, of minimal antenna configurations using three individual antennas which can be likened to configurations in which:
- two of the individual antennas $A_{e1}$ and $A_{e2}$ (those that are the closest out of the three available) are used to form an array of two antennas defining a first coupling which corresponds to the case of the ARRAY_H of the example used previously. Said array makes it possible to form a lobe without the appearance of periodicity phenomena,
- an antenna $A_{e3}$ is not positioned on the axis of the array formed previously, this antenna forms the array ARRAY_B of the preceding example,
- the coupling ($A_{e1}$, $A_{e3}$) or ($A_{e2}$, $A_{e3}$) then defines the combined array ARRAY_C.

Generally, the combined array ARRAY_C should have an axis that is different to that of the other two arrays ARRAY_H and ARRAY_B in order to be able to exploit the pointing orientation diversity of the duly created antenna arrays.

In the context of the use, by the carrier, of an IFF-type interrogation, the individual antennas need to be able to work with waves that are polarized vertically according to the Z axis.

In the case where the two individual antennas $A_{e1}$ and $A_{e2}$ forming the array ARRAY_H are too far apart, a step for discrimination of the secondary lobes linked to periodicity phenomena according to the azimuth axis is also necessary. This step can be performed by using an amplitude discrimination method as described previously. In FIG. 3, this application case would be illustrated by an acceptance zone, 12, formed by a number of vertical windows (in a manner similar to the ZAR, $ZAR_2$, 13) and the ambiguity resolution would make it possible to isolate just one of these windows (case similar to the obtaining of the ZAR, $ZAR_3$, 14).

The notable advantage of the present invention is that it does not constrain the installation of the antenna arrays to a specific placement on the carrier.

The invention claimed is:

1. A method for locating in space, from a carrier, a target of azimuth $A_{estimated}^{target}$ and of elevation angle $S_{estimated}^{target}$ using at least one first linear antenna array with electronic scanning ARRAY_H comprising at least one individual antenna and at least one second linear antenna array with electronic scanning ARRAY_B comprising at least two individual antennas, said target emitting a signal in response to an interrogation from the carrier, the method comprising:

step 1: creating a third combined linear antenna array ARRAY_C by coupling at least one individual antenna of the antenna array ARRAY_H and at least one individual antenna of the antenna array ARRAY_B, step 2: determining the monopulse angle $\Psi_{Rx}^{H}(A,S)$ or $\Psi_{Rx}^{B}(A,S)$, so as to define a first response acceptance zone $ZAR_1$, by a measurement on the signal emitted by the target and received on one of the antenna arrays ARRAY_H or ARRAY_B, with A and S being the potential azimuth and elevation angle values of said target, step 3: determining the monopulse angle $\Psi_{Rx}^C(A,S)$, so as to define a second response acceptance zone $ZAR_2$, by a measurement on the signal emitted by the target and received on the combined antenna array ARRAY_C, said zone being formed by one or more windows in the plane (A,S), step 4: forming, from at least the information items $\Psi_{Rx}^H(A,S)$ and $\Psi_{Rx}^C(A,S)$ or $\Psi_{Rx}^B(A,S)$ and $\Psi_{Rx}^C(A,S)$, a third response acceptance zone $ZAR_3$ equal to the intersection of the two zones $ZAR_1$ and $ZAR_2$ defined previously and making it possible to locate the target from its coordinates $(A_{estimated}^{target}, S_{estimated}^{target})$.

2. The method according to claim 1, further comprising:

step 5: forming a fourth response acceptance zone $ZAR_4$ by eliminating the secondary windows from the zone $ZAR_2$ by comparison of the signal level received on the antenna array ARRAY_H with that received on the antenna array ARRAY_B via an amplitude discrimination method.

3. The method according to claim 1, further comprising:

step 6: accurately determining a measurement of the elevation angle $S_{estimated}^{target}$ of the target based on the monopulse angles ($\Psi_{Rx}^K(A,S)$ $\Psi_{Rx}^C(A,S)$), in which k is to be replaced by B or H, using the following equation:

$$S_{estimated}^{target} = \frac{[a_{(A_{ir},S_{ir})}^C \cdot b_{(A_{ir},S_{ir})}^k(\Psi_{Rx}^k(A,S)) + b_{(A_{ir},S_{ir})}^C(\Psi_{Rx}^C(A,S))]}{[1 - a_{(A_{ir},S_{ir})}^C \cdot a_{(A_{ir},S_{ir})}^k]}$$

in which $a_{(A_{ir},S_{ir})}^k$ and $a_{(A_{ir},S_{ir})}^c$ are parameters dependent on the direction of pointing of the antennas which are calculated on the basis of the patterns of said individual antennas respectively used to form the antenna array ARRAY_H (or ARRAY_B) and the antenna array ARRAY_C, in which $b_{(A_{ir},S_{ir})}^k(\Psi_{Rx}^K(A,S))$ are obtained by a polynomial modeling of the trend of the monopulse angle as a function of the azimuth for a fixed elevation angle value, or as a function of the elevation angle for a fixed azimuth value, with k=H, B or C.

4. The method according to claim 1, further comprising:

step 7: accurately determining a measurement of the azimuth $A_{estimated}^{target}$ of the target based on the monopulse angles ($\Psi_{Rx}^K(A,S), \Psi_{Rx}^C(A,S)$) and on a measurement of the elevation angle $S_{estimated}^{target}$ of the target, in which k is to be replaced by B or H, using the following equation:

$$A_{estimated}^{target} = a_{(A_{ir},S_{ir})}^k S_{estimated}^{target} + b_{(A_{ir},S_{ir})}^k(\Psi_{Rx}^k(A,S))$$

in which $a_{(A_{ir},S_{ir})}^k$ are parameters dependent on the direction of pointing of the antennas and calculated on the basis of the patterns of said individual antennas used to form the antenna arrays ARRAY_H or ARRAY_B, in which $b_{(A_{ir},S_{ir})}^k(\Psi_{Rx}^k(A,S))$ are parameters obtained by a polynomial modeling of the trend of the monopulse angle as a function of the azimuth for a fixed elevation angle value, or as a function of the elevation angle for a fixed azimuth value, with k=B or H.

5. The method according to claim 1, wherein the antenna arrays ARRAY_H and ARRAY_B are located on the nose cone of said carrier and that the antenna array ARRAY_H is located vertically to the antenna array ARRAY_B.

6. The method according to claim 1, wherein the interrogation mode from the carrier to the target is an identification friend or foe (IFF) mode.

7. A system for locating a target by a carrier equipped with a primary radar and a secondary radar, the system comprising:

an interrogation-response system which comprises at least a first antenna array a second antenna array, a switching matrix, a beam combiner, a receiver and a computer suitable for implementing the characteristics of the elevation angle and azimuth locating method according to claim 1.

\* \* \* \* \*

UNITED STATES PATENT AND TRADEMARK OFFICE
CERTIFICATE OF CORRECTION

PATENT NO. : 8,441,392 B2　　　　　　　　　　　　　　　　　　　　　　　　Page 1 of 1
APPLICATION NO. : 13/142724
DATED : May 14, 2013
INVENTOR(S) : Descharles et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 202 days.

Signed and Sealed this
Eighth Day of September, 2015

Michelle K. Lee
*Director of the United States Patent and Trademark Office*